US009215255B2

(12) United States Patent
Avasarala

(10) Patent No.: US 9,215,255 B2
(45) Date of Patent: Dec. 15, 2015

(54) TRANSFER METHOD AND APPARATUS FOR SEAMLESS CONTENT TRANSFER

(75) Inventor: Ranjit Avasarala, Bangalore (IN)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 744 days.

(21) Appl. No.: 12/640,480

(22) Filed: Dec. 17, 2009

(65) Prior Publication Data
US 2010/0161813 A1 Jun. 24, 2010

(30) Foreign Application Priority Data
Dec. 18, 2008 (IN) .......................... 2868/DEL/2008

(51) Int. Cl.
G06F 15/16 (2006.01)
H04L 29/06 (2006.01)
(52) U.S. Cl.
CPC ........ H04L 65/1069 (2013.01); H04L 65/1059 (2013.01); H04L 65/4084 (2013.01); H04L 65/80 (2013.01)
(58) Field of Classification Search
USPC .................. 709/228, 220, 227, 230, 246, 201
See application file for complete search history.

(56) References Cited

U.S. PATENT DOCUMENTS

| 7,949,692 | B2* | 5/2011 | Lemar et al. | 707/822 |
| 8,400,961 | B1* | 3/2013 | Islam et al. | 370/328 |
| 2006/0039367 | A1* | 2/2006 | Wright et al. | 370/382 |
| 2006/0288165 | A1* | 12/2006 | Rosenbloom et al. | 711/115 |
| 2007/0130217 | A1* | 6/2007 | Linyard et al. | 707/201 |
| 2007/0297352 | A1* | 12/2007 | Jabri et al. | 370/261 |
| 2011/0035460 | A1* | 2/2011 | May et al. | 709/213 |
| 2013/0162755 | A1* | 6/2013 | Swanson et al. | 348/14.08 |

* cited by examiner

Primary Examiner — Lan-Dai T Truong
(74) Attorney, Agent, or Firm — Lowenstein Sandler LLP

(57) ABSTRACT

A method and apparatus for seamlessly transferring content from a first communication device to a second communication device is disclosed. The method includes establishing a communication session with a controller for streaming content and sending a request to the controller for sharing the content being currently streamed at the first communication device. The request includes an option tag indicating a share request and an address of the second communication device to which the content is to be shared. The method further includes receiving a notification from the controller once the second communication device starts receiving the content from a point in time at which the request was sent from the first communication device.

20 Claims, 8 Drawing Sheets

TRANSFER METHOD AND APPARATUS FOR SEAMLESS CONTENT TRANSFER

RELATED APPLICATIONS

This application claims the benefit of Indian Patent Application No. 2868/DEL/2008 filed on Dec. 18, 2008, the contents of which is hereby incorporated by reference herein.

FIELD OF THE DISCLOSURE

The present disclosure relates generally to content handling in a communication system and more particularly to seamless transfer of content between communication devices in the communication system.

BACKGROUND

Currently there are several applications like Video-on-Demand (VoD) and Content-on-Demand (CoD) which facilitate downloading of movies, videos and multimedia content dynamically. The mechanism used for download uses either streaming protocols like Session Initiation Protocol (SIP), Real Time Streaming Protocol (RTSP) or a web based protocol like Hypertext Transfer Protocol (HTTP) with Realtime Transport Protocol (RTP). In the above protocols, a user specifies a location of the content that the user wants to download and upon successful connection to the content location, the content is downloaded to the user's device.

Consider a scenario in which a user is watching a video being streamed on the user's mobile device and wants to redirect the video stream to the user's television for better clarity. With the existing solutions, the user needs to pause the streaming session on the mobile device and reinitiate the streaming session from the television. In certain cases, the television may not be able to initiate a session or access the content from the content source. Such solutions create a gap in the viewing of the content during session transfer between devices.

Accordingly, there is a need for seamless transfer of content between communication devices in a communication system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
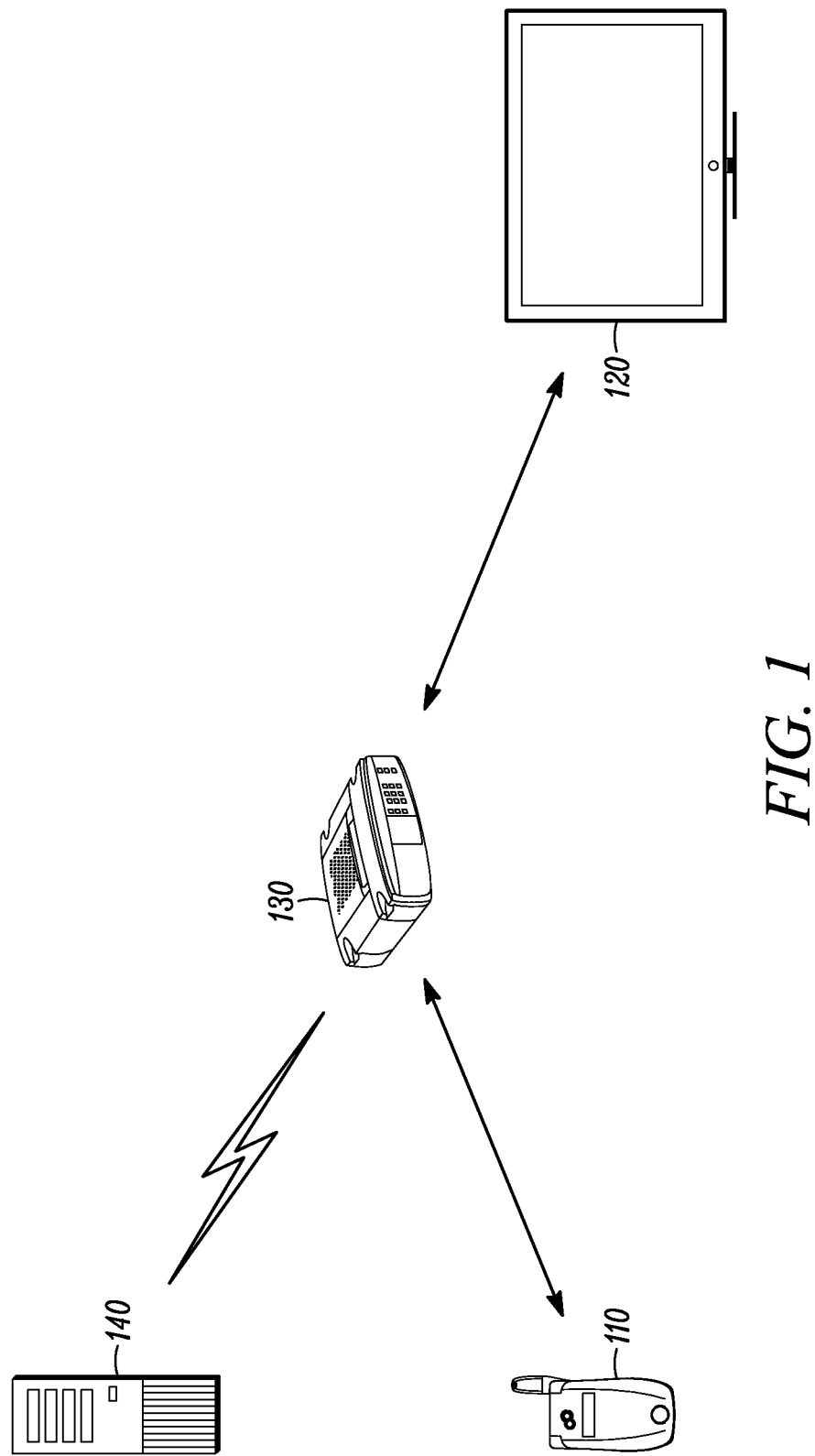
FIG. 1 is a block diagram illustrating a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Various embodiments of the invention provide a method for seamlessly transferring content from a first communication device to a second communication device. The method includes establishing a communication session with a controller for streaming content and sending a request to the controller for sharing the content being currently streamed at the first communication device. The request includes a share request and an address of the second communication device to which the content is to be shared. The method further includes receiving a notification from the controller once the second communication device starts receiving the content from a point in time at which the request was sent from the first communication device.

Before describing in detail the method for seamless content transfer, it should be observed that the present invention resides primarily in combinations of method steps and apparatus components related to seamlessly transferring content from a first communication device to a second communication device. Accordingly, the method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

FIG. 1 is a block diagram illustrating a communication system in accordance with some embodiments. The communication system includes a first communication device 110, a second communication device 120, a controller 130 coupled to the first and second communication devices, and a content server. Although two communication devices are shown, any number (zero and higher) of potential communication devices can be accommodated. Examples of a communication device 110, 120 include a radiotelephone, laptop or other personal or portable computer, a personal digital assistant (PDA), a television (TV), a media player with communication capabilities, or similarly equipped electronic devices having the ability to send and/or receive communication information.

The communication devices 110, 120 may each be coupled to the controller 130 through a wired connection or a wireless connection for transferring and receiving data from the controller 130. In an example, the wired connection can be a universal serial bus (USB) or a RS-232 connection and the wireless connection can be a Bluetooth or a WiFi connection. In an embodiment, the controller 130 is a set-top box (STB) located at a user's premises and connected with an external source of signal such as a telecommunication channel. The content server 140 provides content to the communication device 110 through the controller 130. Examples of content include multimedia files, such as audio or video files or other types of digital information. The content server 140 used herein is a server which streams the content to the viewer and may be maintained by a cable service provider headend or by an internet entertainment portal.

Figure 2:
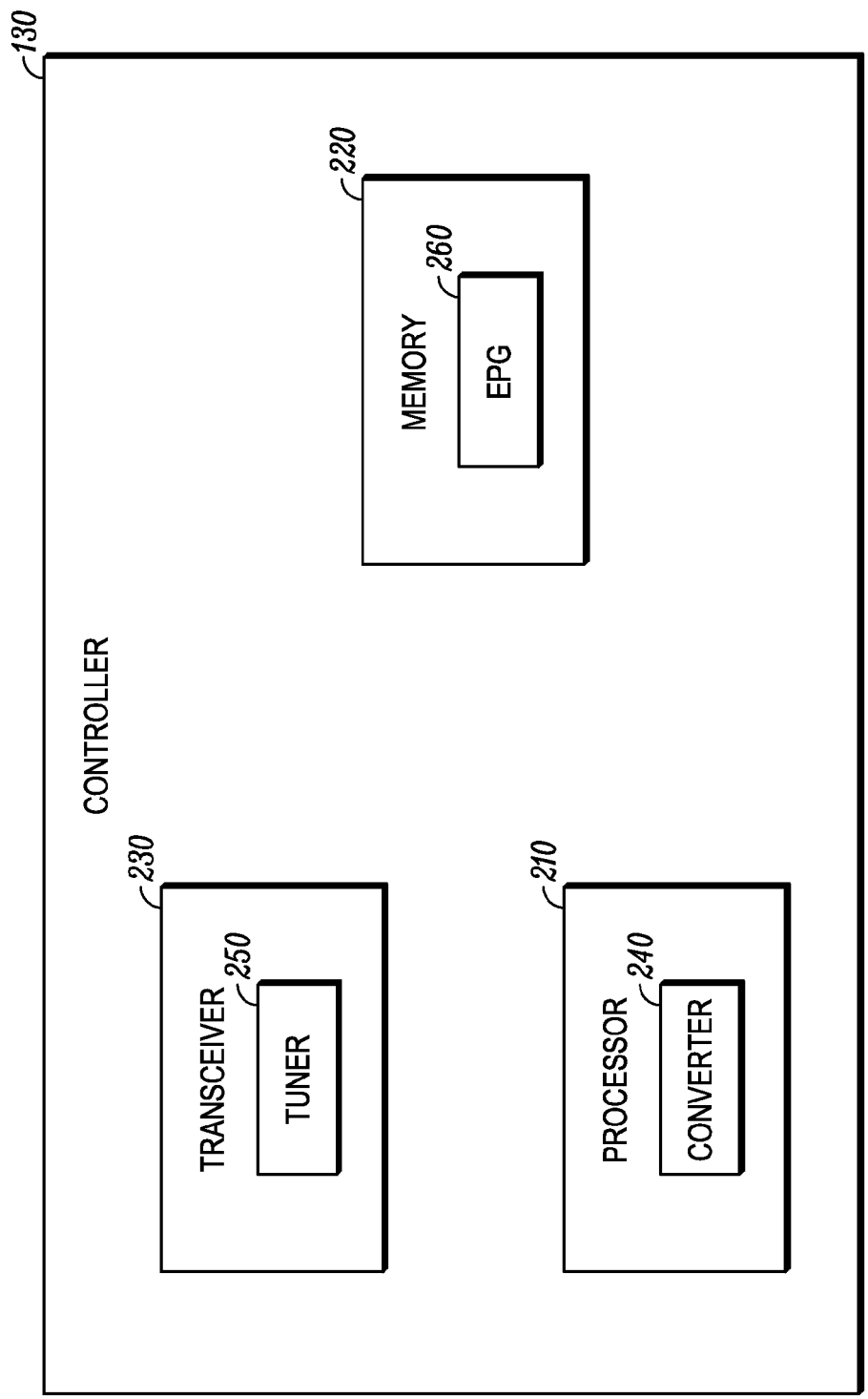
FIG. 2 is a block diagram of the support functionality for seamless transfer of content in accordance with some embodiments.

FIG. 2 is a block diagram of a controller 130 in accordance with some embodiments. The controller, in this embodiment is an Internet Protocol set-top box (IP-STB). The controller connects to an external signal source (content server 140) and decodes received signal into content that can be presented on a display unit such as a PDA. The controller interfaces with a broadband communication link (i.e., DSL, cable, etc.) and is used to receive/decode digital TV broadcasts and allow Internet access and additional functionality through a communication device. The controller 130 includes a processor 210, a memory 220, and a transceiver unit 230. The controller 130 is an integrated unit containing at least all the elements depicted in FIG. 2, as well as any other elements necessary for the controller 130 to perform its particular electronic function. Alternatively, the controller 130 can comprise a collection of appropriately interconnected units or devices housed within the same physical unit 130, wherein such units or devices perform functions that are equivalent to the functions performed by the above-described elements of the controller 130. The controller 130 may be any type of wired or wireless device including capable of interfacing the content source and a TV, but not limited to a set-top box.

The processor 210 includes one or more microprocessors, microcontrollers, DSPs (digital signal processors), state machines, logic circuitry, or any other device or devices that process information based on operational or programming instructions. The controller 130 interfaces with the portable communication device 500 through a wired connection e.g. universal serial bus (USB) port, RS-232 or a wireless connection e.g. Bluetooth or WiFi. The processor 210 includes a converter 240 for performing format conversion on the content based on the capabilities of the communication device to which content is to be transferred. The capabilities of the communication device includes for e.g., device ID such as International Mobile Subscriber Identity (IMSI), Uniform Resource Identifier (URI), and Internet Protocol (IP) address, codec info, resolution etc. In an embodiment, the processor 210 uses a tuning circuit 250 present in the transceiver unit 230 for tuning to available broadcast channels to receive a content being broadcasted. The tuning circuit includes an RF tuner for receiving satellite signals.

The memory 220 can be any form of non-volatile memory, such as a hard disk. The memory 220 is used for storing received information streams and an Electronic Program Guide (EPG) 260. The EPG 260 is an on-screen guide to scheduled broadcast television or radio programs, typically with functions allowing a viewer to navigate, select, and discover content by time, title, channel, genre, etc. by use of their remote control, a keyboard, or other input devices such as a phone keypad. The memory 220 is also used for maintaining a device capability list that includes capabilities of communication devices registered with the controller.

The transceiver 230 can be implemented as a transmitting and receiving component of a two-way wireless communication device. For a controller, a transceiver can be implemented as part of the device hardware and software architecture in accordance with known techniques. In an embodiment, the functions of the transceiver can be implemented in the processor 210. The transceiver unit 230 is used for making content available to the portable communication device 110, 120 over an antenna. The antenna includes any known or developed structure for radiating and receiving electromagnetic energy in the frequency range containing the wireless carrier frequencies.

Figure 3:
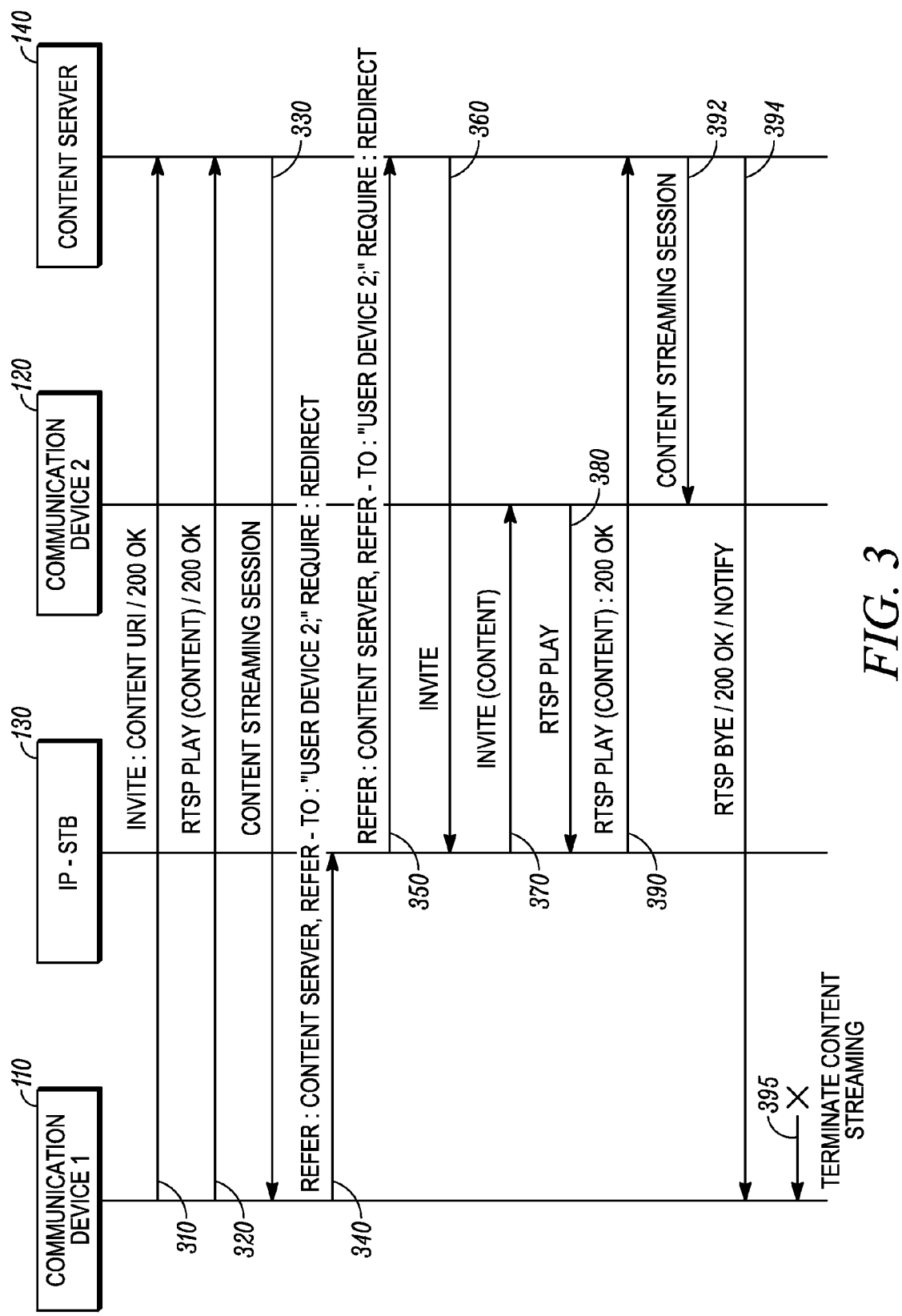
FIG. 3 is a protocol execution flowchart for a content redirection process in accordance with some embodiments.

FIG. 3 is a protocol execution flowchart for redirecting content from a first communication device to a second communication device in accordance with an embodiment. The mechanism for content redirection is based on streaming protocols such as a Session Initiation Protocol (SIP) or a Real Time Streaming Protocol (RTSP). In this embodiment, the first communication device is an SIP based device and the second communication device is a non-SIP based device such as a GSM or CDMA technology based communication device. As shown, the first communication device 110 requests the content server 140 for media content by sending 310 an SIP INVITE request. If the request is successful, a 200 OK acknowledgement is received by the first communication device. An RTSP PLAY message is sent 320 to the content server 140 to cause the requested media content to be played. If the request is successful, a 200 OK acknowledgement is received by the first communication device 110 and content streaming 330 takes place over a streaming session between the content server 140 and the first communication device 110.

While the content is being streamed at the first communication device 110, a user of the first communication device 110 might intend to redirect the streaming session to a second communication device 120, the user expresses intent to redirect the streaming session through e.g., a key press on the first communication device 110. The user then provides an identity of the second communication device 120, for example, by selecting the second communication device 120 from a list of communication devices registered with the STB 130. The identity of the second communication device 120 can be provided by selecting a device from a list of devices provided at the first communication device 110. For example, the identity of the second communication device 120 could include an EMI, Domain name, IMSI, SIM, TV@ip-stb.domain.com. The device selection can be by means of navigating a menu or pressing a pre-configured button. The devices provided in the list are those devices that are registered with the STB 130. At the time of registration each device in the list would specify its capabilities to the STB 130. Such capabilities include device ID, codec info, screen size, resolution, etc. The user may select the second communication device 120 based on the capabilities of each of the devices in the list. Other methods and means of expressing user's intent to redirect content can be performed as can be envisaged by those skilled in the art.

Upon receiving a request from the user to redirect the streaming session, the first communication device 110 sends a request to the IP set-top box (IP-STB) 130 for redirecting the streaming session. The request is sent 340 as a SIP REFER message to the IP-STB to refer the content (VoD/CoD) streaming session to the second communication device 120. The REFER message includes a "Require" header having an option tag indicating a type of content transfer to be made. For example, a "Require" header having a "Redirect" tag indicates that the content being streamed has to be redirected to a second device. A "Require" header having a "Share" tag indicates that the content being streamed has to be shared with a second device. In this embodiment, the REFER message includes a Require header having an option tag indicating a "Redirect" option for redirecting content to the second communication device 120. The REFER message also includes a "Refer-To" header having a URI (address) of the second communication device to which the media content is to be redirected.

In another embodiment, the first communication device 110 is a non-SIP based device and supports RTSP. In such a scenario, the first communication device 110 registers with the STB 130 using its IMSI number or IMEI number. The first communication device 110 expresses its intent to share or redirect content by sending a short message (SMS) to the STB 130 in the following example format.

sms ip-stb share target="user television 2"
sms ip-stb redirect target="user television 2"

The STB 130 then maps the short message from the non-SIP based first communication device 110 into a REFER message and the protocol flow continues as with an SIP based protocol. Alternatively, the non-SIP device can send the short message to a SIP SMS gateway that does the mapping between SMS and REFER messages. At the time of registration, the non-SIP based first communication device sends a short message indicating its device capabilities in an example format as shown below.

sms ip-stb codec: mpeg-4 resolution: 2mp

Upon receiving the REFER message from the first communication device, the STB 130 forwards 350 the REFER request to the content server 140 and initiates a new RTSP session with the second communication device. The content server 140, then extracts the URI of the second communication device 120 from the REFER message and sends 360 an INVITE message to the STB 130. The STB 130 in turn sends 370 an SIP INVITE message to the second communication device 120 for playing the media content. However, prior to sending the SIP INVITE message to the second communication device 120, the STB 130 extracts the URI of the second communication device 120 from the REFER message and determines whether the second communication device 120 is capable of supporting SIP based streaming protocol. This determination is made by the STB 130 by querying a DNS server or by referring to device capabilities data of all devices registered with the STB 130, collected at the time of registration with the STB 130. If it is determined that the second communication device 120 does not support SIP, the STB 130 sends an RTSP SETUP request to the second communication device 120 instead of the SIP INVITE request at 370. The RTSP SETUP request includes a media stream URI and a transport specifier.

If the second communication device 120 accepts the request, the second communication device 120 sends 380 an RTSP PLAY message to the STB 130. The STB 130 then sends 390 an RTSP PLAY request to the content server 140 to cause the content to be played on the second communication device 120. The content server 140 then begins 392 a content streaming session with the second communication device 120. In an embodiment, the STB 130 performs content streaming to the second communication device 120 instead of the content server 140. Upon receiving an RTSP PLAY message from the first communication device 110, the STB 130 shares the streaming session that it already has with the first communication device 110 with the second communication device 120. When the content streaming begins at the second communication device 120, the content server 140 notifies 394 the first communication device 110 that the content streaming has to be terminated with the first communication device 110 and terminates 395 the streaming session with the first communication device 110.

Figure 4:
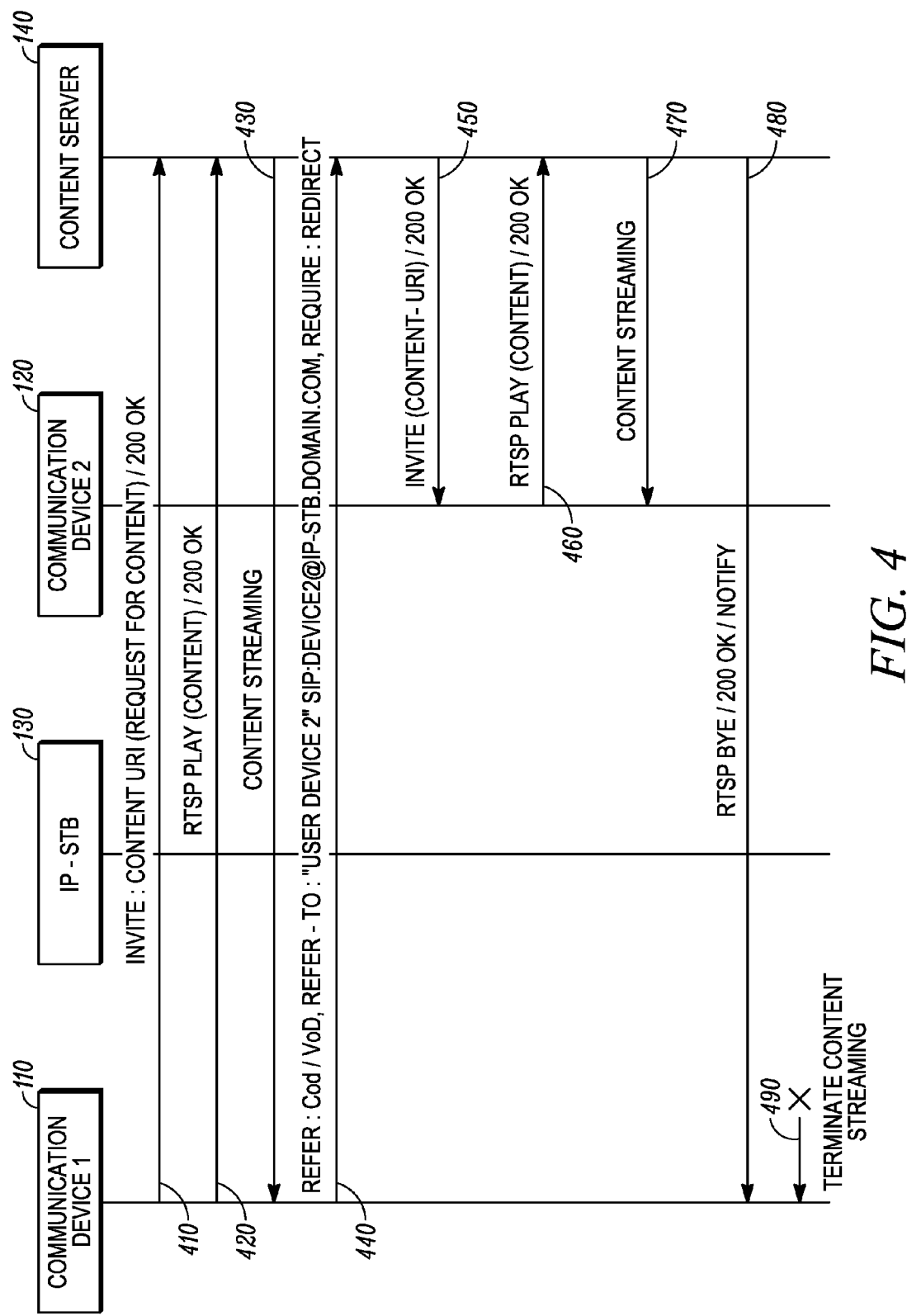
FIG. 4 is a protocol execution flowchart for a content redirection process in accordance with some other embodiments.

FIG. 4 is a protocol execution flowchart for redirecting content from a first communication device 110 to a second communication device 120, the second communication device 120 being an SIP based device. As shown, the first communication device 110 requests 410 the content server 140 for media content by sending an SIP INVITE request requesting a media stream. If the request is successful, a 200 OK acknowledgement is received by the first communication device 110. An RTSP PLAY message is sent 420 to the content server to cause the requested media stream to be played. If the request is successful, a 200 OK acknowledgement is received by the first communication device 110 and content streaming 430 takes place over a streaming session between the content server 140 and the first communication device 110.

The user of the first communication device 110 expresses intent to redirect the streaming session to a second communication device 120 and provides an identity of the second communication device 120. Upon receiving a request from the user to redirect the streaming session, the first communication device 110 sends a request to the content server 140 through the STB 130 for redirecting the streaming session. The request is sent 440 as a SIP REFER message. In this embodiment, the REFER message includes a require header having "Redirect" option. The REFER message includes a URI of the second communication device 120 to which the content is to be redirected. The REFER message also includes a URI of the streaming content to be redirected. Upon receiving the REFER message the content server 140 looks at the require header of the REFER message for the option tag. An example format of the REFER message is as shown below.

REFER: Cod/VoD, Refer-To: "User Television" tv@ip-stb.domain.com, Require: share
REFER: Cod/VoD, Refer-To: "User Device2" sip: device2@ip-stb.domain.com, Require: redirect If the option tag is "Redirect," the content server 140 extracts the URI of the second communication device 120 from the REFER message and sends 450 a SIP INVITE message to the second communication device 120. The second communication device 120 then sends 460 a play request to the content server 140 allowing the content to be played on the second communication device 120. After the content server 140 starts 470 streaming the content to the second communication device 120, the content server 140 closes the streaming session with the first communication device 110 by sending 480 a BYE message. At 490, content streaming with the first communication device is terminated.

Figure 5:
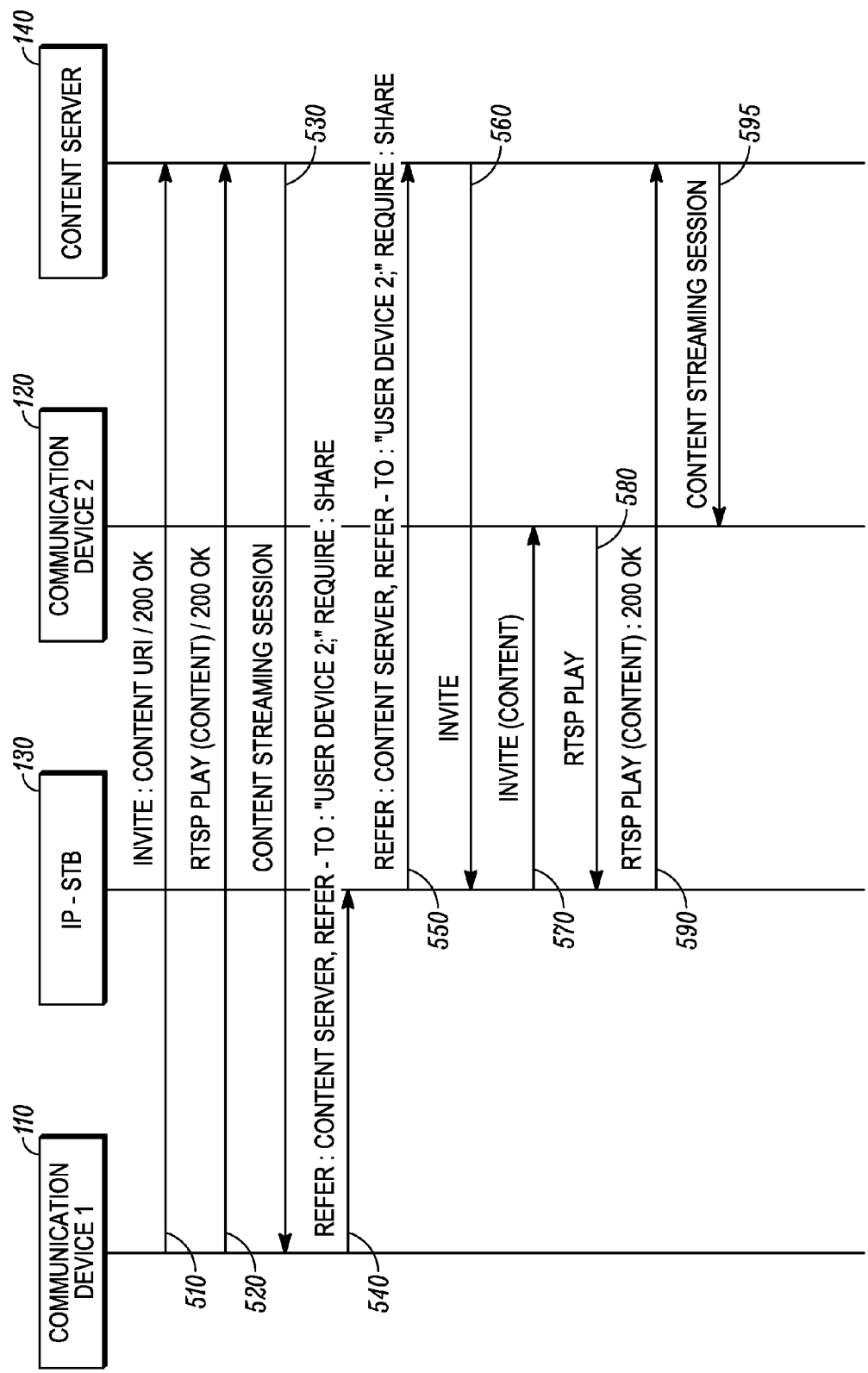
FIG. 5 is a protocol execution flowchart for a content sharing process in accordance with some embodiments.

FIG. 5 is a protocol execution flowchart for sharing content from a first communication device 110 to a second communication device 120, the second communication device 120 being a non-SIP based device such as a GSM, CDMA technology based communication device. As shown, the first communication device 110 requests 510 the content server 140 for media content by sending an SIP INVITE request requesting a media stream. If the request is successful, a 200 OK acknowledgement is received by the first communication device 110. An RTSP PLAY message is sent 520 to the content server 140 to cause the requested media stream to be played. If the request is successful, a 200 OK acknowledgement is received by the first communication device 110 and content streaming 530 takes place over a streaming session between the content server 140 and the first communication device 110. When a user of the first communication device 110 intends to share the streaming session to a second communication device 120, the user selects the second communication device 120 from a list of communication devices registered with the STB 130.

Upon receiving a request from the user to share the streaming session, the first communication device 110 sends a request to the IP-STB 130 for sharing the streaming session.

The request is sent 540 as an SIP REFER message to the IP-STB 130. The REFER message includes a Require header having an option tag indicating a "Share" option and a URI of the second communication device 120 to which the content is to be shared. The REFER message also includes a URI of the streaming content to be shared. Upon receiving the REFER message from the first communication device 110, the STB 130 initiates a new RTSP session with the second communication device 120. The new RTSP session is initiated by sending 550 the REFER message to the content server 140. The content server 140, then extracts the URI of the second communication device 120 from the REFER message and sends 560 an INVITE message to the STB 130. The STB 130 in turn sends 570 an SIP INVITE message to the second communication device 120 for playing the media content.

However, prior to sending the SIP INVITE message to the second communication device 120, the STB 130 extracts the URI of the second communication device 120 from the REFER message and determines whether the second communication device 120 is capable of supporting SIP based streaming protocol. This determination is made by the STB by querying a DNS server or based on device capabilities data collected at the time of registration with the STB 130. If it is determined that the second communication device 120 does not support SIP, the STB 130 sends an RTSP SETUP request to the second communication device 120 instead of SIP INVITE request at 570. If the second communication device 120 accepts the request, the second communication device 120 sends 580 an RTSP PLAY message to the STB 130. The STB 130 then sends 590 an RTSP PLAY request to the content server 140 to cause the content to be played on the second communication device 120. The content server 140 then begins 595 a content streaming session with the second communication device 120 thereby performing simultaneous content streaming with both the first and second communication devices (110 and 120). In an embodiment, the STB 130 performs content streaming to the second communication device 120 instead of the content server 140. Upon receiving an RTSP PLAY message from the first communication device 110, the STB 130 shares the streaming session that it already has with the first communication device 110 with the second communication device 120.

Figure 6:
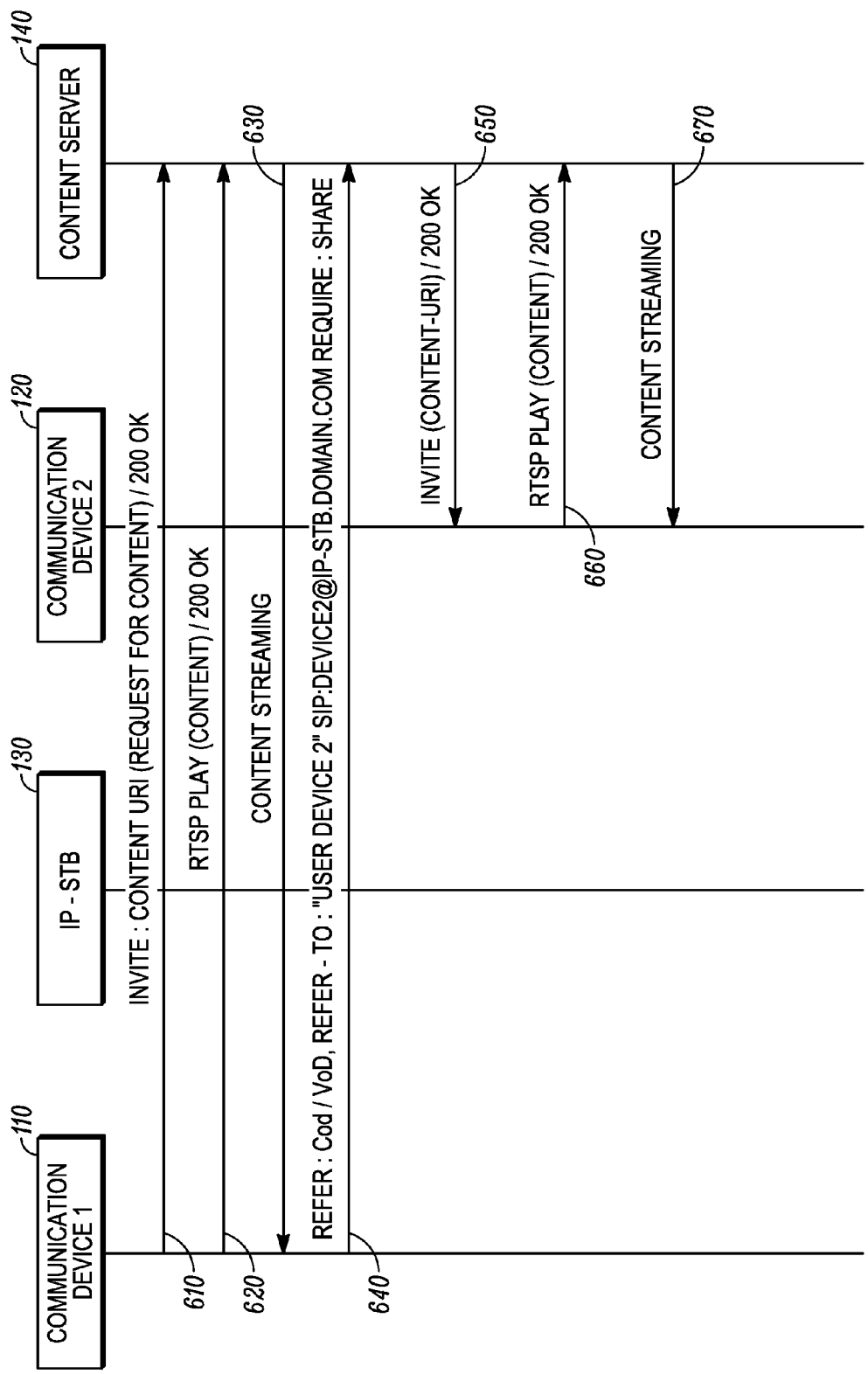
FIG. 6 is a protocol execution flowchart for a content sharing process in accordance with some other embodiments.

FIG. 6 is a protocol execution flowchart for sharing content from a first communication device 110 to a second communication device 120 in accordance with an embodiment. In this embodiment, the second communication device 120 is an SIP based device. The protocol flow from 610 to 630 is similar to that described with reference to protocol flow 410 to 430 of FIG. 4. In this embodiment the user of the first communication device 110 wants to share a streamed content to a second communication device 120. The user expresses his/her intent to share the content being streamed by activating an input key on the first communication device 110. The user then provides an identity of the second communication device 120 by selecting a device from a device list.

Upon receiving a request from the user to share content, the first communication device 110 sends a request to the content server 140 for sharing content with a second communication device 120. The request is sent 640 as a REFER message which includes a require header having an option tag indicating a share request. The REFER message includes a URI of the second communication device 120 to which the content is to be shared and a URI of the streaming content to be shared. Upon receiving the REFER message the content server 140 looks at the require header of the REFER message for the option tag. If the option tag is "Share," the content server extracts the URI of the second communication device 120 from the REFER message and sends 650 an INVITE message to the second communication device 120. The second communication device 120 then sends 660 a play request to the content server 140 to play the content. The content server then 140 starts streaming 670 the content to the second communication device 120, thereby performing simultaneous content streaming with both the first and second communication device (110 and 120).

Figure 7:
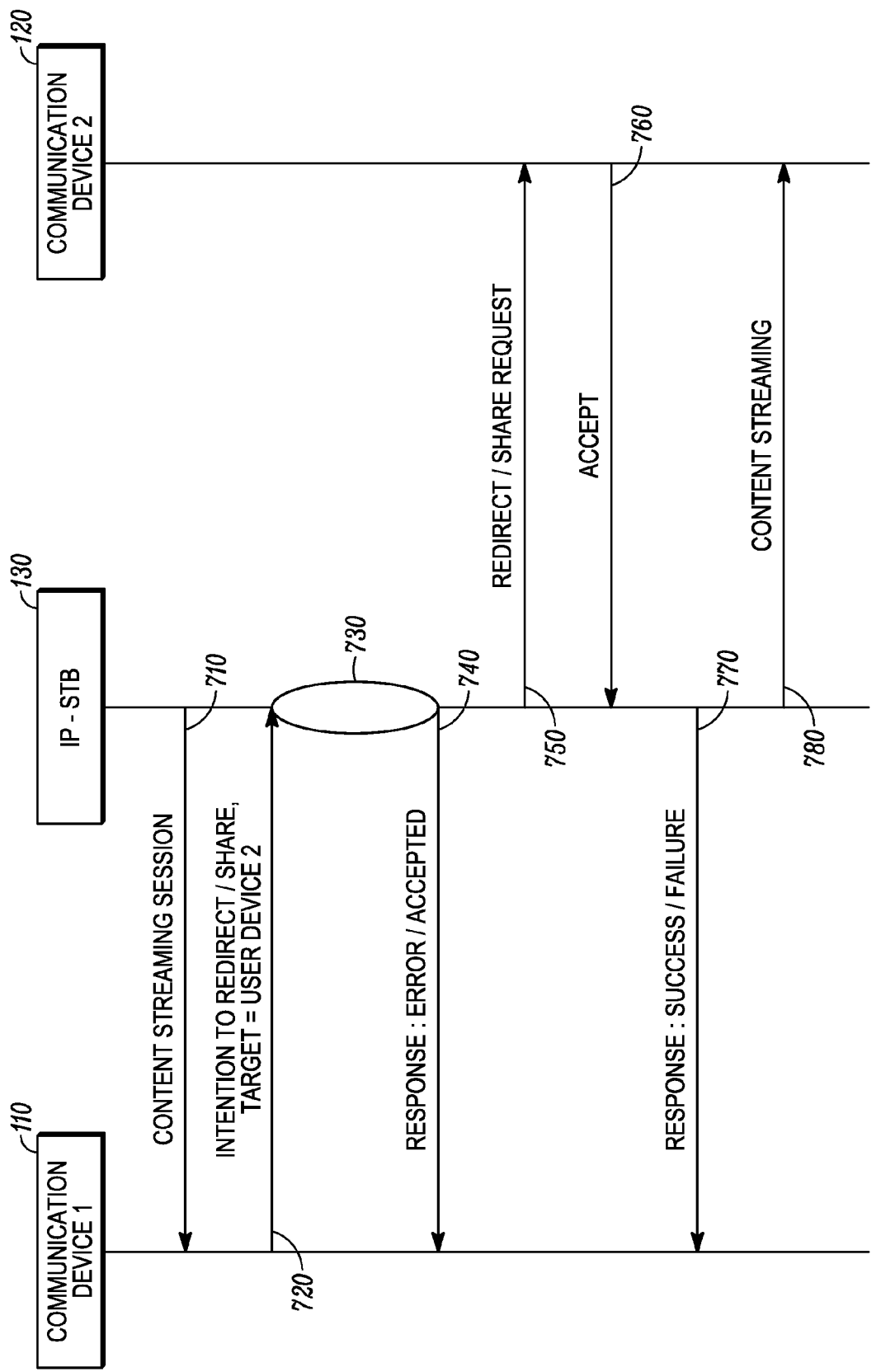
FIG. 7 is a protocol execution flowchart for a content handling process in accordance with some embodiments.

FIG. 7 is a protocol execution flowchart for a content handling process in accordance with some embodiments. As shown, the first communication device 110 establishes 710 a streaming session with the IP-STB 130 for receiving content from a content server 140. The first communication device 110 expresses 720 intent to share or redirect content to a second communication device 120 by means of a REFER message as discussed above with reference to FIGS. 3 and 5. In an embodiment, the first communication device 110 selects the second communication device 120 from a list of devices registered with the STB 130. The STB 130 maintains a list of devices and their corresponding capabilities received at the time of registration. Such device capabilities include device ID, codec info, resolution, display size, etc. Using the device capability list, the first communication device selects the second communication device. For example, the user of the first communication device may choose a device having a high resolution as the second communication device. Upon receiving the request, the IP-STB 130, looks up 730 the device capability list Using the device capability list, the STB 130 determines whether the second communication device 120 is capable of supporting a particular format in which the content is being streamed at the first communication device 110. If it is determined that the second communication device 120 cannot support the particular format, the STB 130 performs content format conversion e.g., resolution conversion, to suit the capabilities of the second communication device 120. The STB 130 includes a converter for performing format conversion. In another example, the STB 130 includes a media gateway to perform format conversion. An example of the device capability list is shown below.

| Device name | ID: IMSI/URI/IP/other | Codecs | Resolution |
| --- | --- | --- | --- |
| Mobile1 (CDMA/GSM) | 9886099860 | DVB-H | 2 MP |
| TV | TV1 | Mpeg-4 | HD |
| Mobile2 (SIP) | Sip:user@office.domain.com | H.264/ Mpeg-2 | 1.3 MP |

The STB 130 then sends a notification 740 to the first communication device 110 that content transfer is possible. The STB 130 then sends 750 a request to the second communication device 120 to accept content transfer. The request includes either a share or redirect request in order to share or redirect the streaming session to the second communication device. If the second communication device accepts 760 the request to transfer content, content streaming begins at the second communication device 120. The STB 130 notifies 770 the first communication device 110 of successful content transfer and begins streaming 780 the content to the second communication device 120. Otherwise, the STB 130 notifies the first communication device 110 of a failed content transfer request. If at 730, the STB 130 determines that the second communication device 120 does not support a particular format and the STB 130 is not able to perform content format conversion, then the STB 130 sends 740 an error response to the first communication device 110 indicating that the streaming session cannot be transferred to the second communication device 120.

Figure 8:
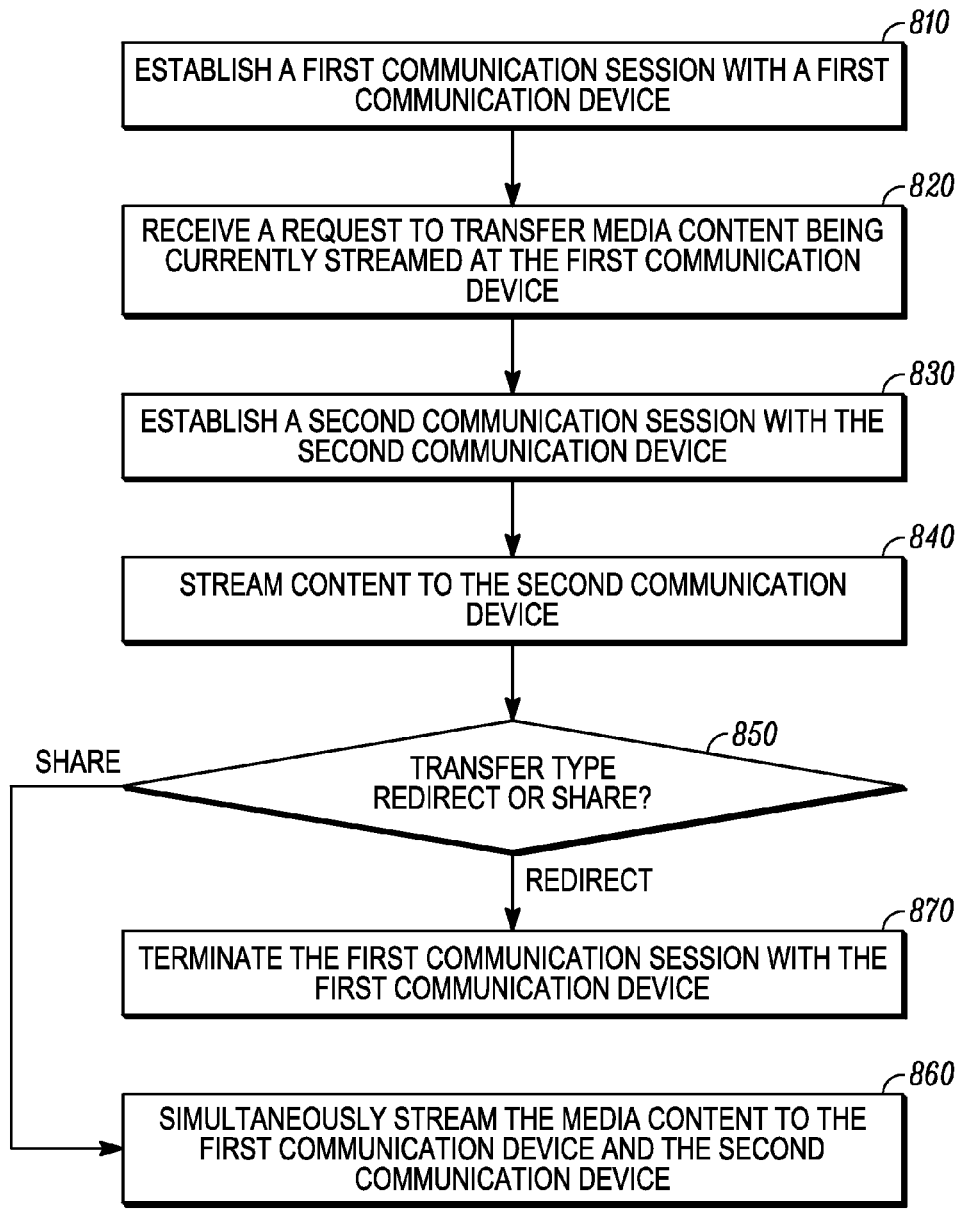
FIG. 8 is a flowchart of a method for seamless transfer of content in accordance with some embodiments.

FIG. 8 is a flowchart of a method for seamless transfer of content in accordance with the protocol flow diagram of FIGS. 3-6. As discussed above, the STB 130 establishes 810 a communication session with a first communication device and streams a requested content to the first communication device. The STB then receives 820 a request from the first communication device to transfer the media content being currently streamed at the first communication device to a second communication device. The second communication device is a device registered with the STB whose capabilities are made known to the STB at the time of registration. The STB then establishes 830 a second communication session with the second communication device and streams 840 the media content to the second communication device. If the transfer type is determined 840 as "share," the content streaming 850 takes place simultaneously with both the first communication device and the second communication device. If the transfer type is "redirect," the first streaming session is terminated 860 with the first communication device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method comprising:
   establishing, by a first communication device, a communication session with a controller;
   sending, by the first communication device, a request to the controller for redirecting or sharing content being currently streamed as part of a first streaming session for playback at the first communication device, the content being played at a point in time when the request is sent, wherein the request includes:
      an option tag indicating at least one of a redirect request or a share request, and
      an address of a second communication device to which the content is to be redirected or shared; and
   for the share request, receiving, at the first communication device, a notification that the controller has initiated a second streaming session with the second communication device and has started sharing the content with the second communication device, the share request indicating that playback of the content at the second communication device is to start at the point in time, for the redirect request, terminating the first streaming session at the first communication device upon receiving a notification that the controller has initiated streaming to the second communication device, wherein the first streaming session at the first communication device is redirected to the second communication device, the redirect request indicating that playback of the content at the second communication device is to start at the point in time.

2. The method of claim 1, wherein sending the request for sharing the content comprises sending the request through a user input while the content is being streamed at the first communication device.

3. The method of claim 1, further comprising:
registering with the controller and providing device capabilities information to the controller while registering.

4. The method of claim 1, wherein the notification is received from the controller once the second communication device starts receiving the content at least one of from the point in time at which the request was sent from the first communication device or simultaneously with the first communication device.

5. A method comprising:
establishing, at a controller, a communication session with a first communication device;
receiving, at the controller, a request from the first communication device to share content being currently streamed as part of a first streaming session for playback at the first communication device, the content being played at a point in time when the request is sent, wherein the request includes an option tag indicating a share request and an address of a second communication device to which the content is to be shared; and
initiating, by the controller in response to the request, a second streaming session with the second communication device to share the content, wherein the playback of the content at the second communication device is to start at the point in time, and wherein the first and second streaming sessions are to be concurrently streamed to the first and second communication devices, respectively.

6. The method of claim 5, wherein the content is streamed from a point in time at which the request was received from the first communication device.

7. The method of claim 5, further comprising:
maintaining a device capability table which includes capabilities of communication devices that are registered with the controller.

8. The method of claim 5, further comprising:
performing format conversion on the content based on capabilities of the second communication device.

9. The method of claim 5, further comprising:
sending an error response if the second communication device is unable to receive the content.

10. A method comprising:
establishing, at a controller, a communication session with a first communication device;
receiving, at the controller, a request from the first communication device to redirect content currently being streamed as part of a first streaming session for playback at the first communication device, the content being played at a point in time when the redirect request is sent, wherein the redirect request includes an option tag indicating the redirect request and an address of a second communication device to which the content is to be redirected; and
initiating, by the controller in response to the redirect request, a second streaming session with the second communication device, a termination of the first streaming session at the first communication device, and a playback of the content at the second communication device to start at the point in time.

11. A system comprising:
a memory to store instructions;
a transceiver;
a processing device, coupled with the memory and the transceiver, to execute the instructions, the processing device to:
establish a communication session with a first communication device;
receive a request to transfer content being currently streamed as part of a first streaming session for playback at the first communication device, the content being played at a point in time when the request is sent, wherein the request includes:
an option tag indicating at least one of a redirect request or a share request, and
an address of a second communication device to which the content is to be redirected or shared; and
for the share request, initiating a second streaming session with the second communication device to share the content, wherein the first and second streaming sessions are to be concurrently streamed to the first and second communication devices, respectively; and
for the redirect request, initiate the second streaming session with the second communication device and initiate a playback of the content at the second communication device to start at the point in time.

12. The system of claim 11, wherein the system is at least one of a set-top box, a signaling gateway, or a content streaming server.

13. The system of claim 11, wherein the processing device receives the request to transfer content as a Session Initiation Protocol (SIP) based message.

14. The system of claim 11, wherein the processing device receives the request to transfer content as a short message, if the first communication device is a non-SIP based device.

15. The system of claim 14, further comprising a signaling gateway to convert the short message from the non-SIP based communication device into an SIP based message.

16. The system of claim 11, wherein the processing device is further to terminate the session with the first communication device after effecting content streaming with the second communication device if the option tag indicates the redirect request to the second communication device.

17. The system of claim 11, wherein the processing device is further to simultaneously stream the content to the first communication device and the second communication device when the option tag indicates the share request to share the content with the second communication device.

18. The system of claim 11, wherein the memory maintains a device capability list that includes capabilities of devices registered with the processing device.

19. The system of claim 18, wherein the second communication device is selected based on the capabilities provided in the device capability list.

20. The system of claim 11, wherein the processing device comprises a converter to perform format conversion on the content based on capabilities of the second communication device.

* * * * *